US011416860B2

(12) United States Patent
England et al.

(10) Patent No.: US 11,416,860 B2
(45) Date of Patent: Aug. 16, 2022

(54) AUTOMATED DATA PROCESSING SYSTEM

(71) Applicant: Visa International Service Association, San Francisco, CA (US)

(72) Inventors: Natalie England, Foster City, CA (US); Justin Howe, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 46 days.

(21) Appl. No.: 15/931,300

(22) Filed: May 13, 2020

(65) Prior Publication Data

US 2021/0357933 A1 Nov. 18, 2021

(51) Int. Cl.
*G06Q 20/40* (2012.01)
*G06Q 20/38* (2012.01)
*H04L 9/40* (2022.01)

(52) U.S. Cl.
CPC ......... *G06Q 20/401* (2013.01); *G06Q 20/385* (2013.01); *G06Q 20/3821* (2013.01); *G06Q 20/405* (2013.01); *H04L 63/08* (2013.01)

(58) Field of Classification Search
CPC ........ G06Q 50/26; G06Q 40/00; G06Q 20/12; G06Q 40/02; G06Q 20/40; G06Q 20/401; G06Q 20/3821; G06Q 20/385; G06Q 20/405; H04L 63/08
USPC .......................................................... 705/44
See application file for complete search history.

(56) References Cited

U.S. PATENT DOCUMENTS

| | | | |
|---|---|---|---|
| 5,724,523 A | 3/1998 | Longfield | |
| 7,225,156 B2 * | 5/2007 | Fisher | G06Q 20/02 235/379 |
| 8,489,476 B1 * | 7/2013 | Lester | G06Q 30/0609 705/35 |
| 8,719,163 B2 | 5/2014 | Lynch et al. | |
| 8,762,236 B1 * | 6/2014 | Shirey | G06Q 20/10 705/35 |
| 8,892,468 B1 | 11/2014 | Litle | |
| 9,143,500 B1 * | 9/2015 | Gibson | G06Q 20/3255 |
| 9,818,104 B1 | 11/2017 | Katzer et al. | |
| 10,664,910 B1 * | 5/2020 | Koshet | G06Q 40/025 |
| 2012/0072347 A1 | 3/2012 | Conway | |
| 2012/0066124 A1 | 5/2012 | Modi | |
| 2014/0058910 A1 * | 2/2014 | Abeles | G06Q 50/265 705/31 |
| 2014/0249946 A1 | 9/2014 | Balasubramanian | |

(Continued)

OTHER PUBLICATIONS

Kavanagh, "Sign Here: e-banking contracts coming soon; Make it", Sydney Morning Herald, Nov. 1, 2006.*
Large, "Who offers the best deliver system", Corporate finance, suppl. Technology in Treasury Management: 50-61, Euromoney Institutional Investor PLC, Sep. 1998.*

(Continued)

*Primary Examiner* — Frantzy Poinvil
(74) *Attorney, Agent, or Firm* — Kilpatrick Townsend & Stockton LLP (57) ABSTRACT

A method is disclosed. The method includes transmitting a verification request message comprising one or more personal data elements associated with a user and a target account identifier to an authorizing entity computer. The method includes receiving a verification response message comprising a verification result from the authorizing entity computer. Lastly, the method includes transmitting a credit transaction message comprising a source account identifier and an amount to the authorizing entity computer, which credits an account of the user with the amount.

16 Claims, 8 Drawing Sheets

(56) References Cited

U.S. PATENT DOCUMENTS

| | | | | |
|---|---|---|---|---|
| 2016/0012465 | A1* | 1/2016 | Sharp | G06Q 20/386 |
| | | | | 705/14.17 |
| 2016/0034900 | A1* | 2/2016 | Nelsen | G06Q 20/3224 |
| | | | | 705/44 |
| 2016/0110693 | A1* | 4/2016 | Howe | G06Q 20/12 |
| | | | | 705/40 |
| 2017/0070500 | A1* | 3/2017 | Hockey | H04L 9/3228 |
| 2017/0323280 | A1* | 11/2017 | DeSilva | G06Q 20/22 |
| 2018/0349993 | A1* | 12/2018 | Straub | G06Q 50/265 |
| 2019/0303891 | A1* | 10/2019 | Hammad | G06Q 20/12 |
| 2019/0318122 | A1* | 10/2019 | Hockey | H04W 12/084 |

OTHER PUBLICATIONS

"IRS: Scam Blends CEO Fraud, W-2 Phishing", https://krebsonsecurity.com/2017/02/irs-scam-blends-ceo-fraud-w-2-phishing/, Feb. 2017, 11 pages.

"Don't Be a Victim of Tax Refund Fraud in '16"; https://krebsonsecurity.com/2016/01/ftc-tax-fraud-behind-47-spike-in-id-theft/, Dec. 2015, 10 pages.

"Tax Refund Fraud: What You Should Know", https://blog.authentic8.com/tax-refund-fraud/, Mar. 29, 2016, 14 pages.

"IRS Bolsters Refund Fraud Defenses, Cuts Fraud in Half in 2016", https://frankonfraud.com/identity-theft/irs-bolsters-refund-fraud-defenses-cuts-fraud-in-half-in-2016/, Nov. 4, 2016, 14 pages.

"IRS fraud screening falls short", https://www.accountingtoday.com/news/irs-tax-refund-fraud-screening-falls-short, Mar. 28, 2018, 10 pages.

* cited by examiner

AUTOMATED DATA PROCESSING SYSTEM

CROSS-REFERENCE TO RELATED APPLICATIONS

None.

BACKGROUND

Identity theft is a significant problem. One area where identity theft causes considerable harm and disruption includes tax refunds. An identity thief can impersonate a real person and file a fraudulent tax return for that person. The identity thief will then obtain that person's tax refund. Some reports have indicated that identity theft for fraudulent tax refunds from the federal government alone exceeds $6.5 billion per year. Other situations were similar types of fraud can exist can include payments relating to entitlements and refunds.

Another problem relating to payments such as tax refunds is that they are slow. Some refunds can take up to twenty one days to be processed. It would be desirable if such payments could be made more quickly while also being secure.

Embodiments of the invention address these and other problems, individually and collectively.

SUMMARY

Embodiments of the invention are directed to data processing systems and methods.

One embodiment of the invention is directed to a method comprising: transmitting, by a computer, a verification request message comprising one or more personal data elements associated with a user and a target account identifier to an authorizing entity computer; receiving, by the computer, a verification response message comprising a verification result from the authorizing entity computer; and transmitting, by the computer, a credit transaction message comprising a source account identifier and an amount to the authorizing entity computer, which credits an account of the user with the amount.

Another embodiment of the invention is directed to a computer comprising: a processor; and a non-transitory computer readable medium, the non-transitory computer readable medium comprising code, executable by the processor for implementing a method comprising: transmitting a verification request message comprising one or more personal data elements associated with a user and a target account identifier to an authorizing entity computer; receiving a verification response message comprising a verification result from the authorizing entity computer; and transmitting a credit transaction message comprising a source account identifier and an amount to the authorizing entity computer, which credits an account of the user with the amount Another embodiment of the invention is directed to a method comprising: receiving, by an authorizing entity computer, a verification request message comprising a target account identifier and a first personal data element from a computer; retrieving, by the authorizing entity computer a second personal data element from a data storage; determining, by the authorizing entity computer, if the first personal data element matches the second personal data element; generating, by the authorizing entity computer, a verification result in response to determining if the personal data element matches the second personal data element; transmitting, by the authorizing entity computer, a verification response message comprising the verification result to the computer; and crediting, by the authorizing entity, the target account identifier for an amount.

Another embodiment of the invention is directed to a computer comprising a computer comprising: a processor; and a non-transitory computer readable medium, the non-transitory computer readable medium comprising code, executable by the processor for implementing a method comprising: receiving a verification request message comprising a target account identifier and a first personal data element from a computer; retrieving a second personal data element from a data storage; determining, by the authorizing entity computer, if the first personal data element matches the second personal data element; generating a verification result in response to determining if the first personal data element matches the second personal data element; transmitting a verification response message comprising the address verification result to the computer; and crediting the target account identifier for an amount.

These and other embodiments of the invention are described in further detail below.

DETAILED DESCRIPTION

Before discussing embodiments of the invention, some description of some terms may be helpful.

A method according to an embodiment of the invention can include transmitting, by a computer, a verification request message comprising a personal data element such as an address associated with a user and a target account identifier to an authorizing entity computer. The authorizing entity computer may be an issuer computer. The method may also comprise receiving a verification response message comprising an address verification result from the authorizing entity computer, and then transmitting a credit transaction message comprising a source account identifier and an amount to the authorizing entity computer, which credits an account of the user with the amount. The amount can be associated with a refund or reimbursement where funds can be pushed to an account associated with a target account identifier.

Embodiments of the invention have a number of advantages. As noted above, identity theft is a significant problem and misdirected payments and refunds can be a consequence of identity theft. By performing the verification request using personal data element such as an address prior to pushing money to a target account, an identity thief is unable to receive funds by impersonating someone else, because an authorizing entity such as an issuer ties a target account such as a credit or debit card account of a user to the user's actual address.

Illustratively, an identity thief may steal a person's personal information and may attempt to fill out that person's tax return to fraudulently obtain their tax refund. The identity thief would attempt to substitute his or her own account number for the legitimate user's account number on the tax return, which contains the legitimate user's name, address, social security number, and other information about the legitimate user. If the above-described verification process is run in this scenario, then the authorizing entity computer would receive the identity thief's account number and a legitimate address of the legitimate user from a data processing computer (e.g., an Internal Revenue Service computer) in a verification request message. The authorizing entity computer would then attempt to look up the address corresponding to that account number in a database or memory. The address that is retrieved would not be that of the legitimate user that is being defrauded, but would be that of the identity thief. At this point, the address received from the data processing computer would not match the address that is stored with the authorizing entity computer for the target account identifier. The authorizing entity computer would then generate an indication that the verification failed, and this indication would be transmitted back to the data processing computer. The data processing computer could then decide that it will not process the refund, because the absence of a match is indicative of identity theft.

If the user requesting the refund is legitimate and the address received by the authorizing entity computer matches the address that is stored by the authorizing entity computer in association with the target account identifier for the target account to be credited, then an original credit transaction message (OCT message) may be initiated by the data processing computer and transmitted to the authorizing entity computer to credit the target account for the refund amount. The target account identifier can be a credit or debit card account number, and it can be credited very quickly (almost in real time).

Before further describing some embodiments of the invention, some descriptions of some terms are provided below.

A "communication device" may comprise any suitable electronic device that may be operated by a user, which may also provide remote communication capabilities to a network. A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "user" may include an individual. In some embodiments, a user may be associated with one or more personal accounts and/or mobile devices. The user may also be referred to as a cardholder, account holder, or consumer in some embodiments.

A "resource provider" may be an entity that can provide a resource such as goods, services, information, and/or access. Examples of resource providers includes merchants, data providers, transit agencies, governmental entities, venue and dwelling operators, etc.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue payment credentials stored on a user device, such as a cellular telephone, smart card, tablet, or laptop to the consumer.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCW (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "verification request message" can comprise a message that can be used to at least request verification of one or more personal data elements. In some embodiments, the data elements can be an address, a name, personal identifiable information, etc. In some embodiments, the verification request message may include other types of data elements such as account identifiers including source account identifiers, target account identifiers, etc. A verification request message can be in any suitable data format (e.g., ISO 8583, XML, etc.).

A "verification response message" can comprise any suitable message that responds to a verification request message. A verification response message may comprise a personal data element verification result such as an address verification result. A verification response message may be in any suitable data format (e.g., ISO 8583, XML, etc.).

A "credit transaction message" may include a message that initiates a credit to an account. In some embodiments, the credit transaction message may be an Original Credit Transaction (OCT) message. An OCT (Original Credit Transaction) is typically a clearing and settlement credit transaction designed for use in business applications such as a business money transfer or business-to-consumer repayments. When used in embodiments of the present invention, the OCT transaction can be used to deliver funds to the target account. In some cases, It is separate from, and in some cases, can takes place after, an AFT transaction.

An AFT (Account Funding Transaction) is a transaction designed to supply funds to another account such as a credit, prepaid, debit, ATM or on-line account. In some cases, an AFT is paying the service provider bank for sending funds to the recipient and results in a debit to the sender's card account.

A "target account" can be an account where funds or value is to be sent, deposited, or credited. Target accounts can include bank accounts, credit card accounts, debit card accounts, demand accounts, etc., and can be associated a payment device. A target account identifier can be in the form of a PAN (primary account number) or payment token (i.e., a substitute for a real account number) and can have a length of 16, 18, or 19 digits. A target account identifier may also include other information such as an expiration date or CVV2 (card verification value).

A "source account" can be an account where funds or value are to be withdrawn or debited. Source accounts can include bank accounts, credit card accounts, debit card accounts, demand accounts, etc., and can be associated a payment device. A source account identifier can be in the form of a PAN (primary account number) or payment token (i.e., a substitute for a real account number) and can have a length of 16, 18, or 19 digits. A source account identifier may also include other information such as an expiration date or CVV2 (card verification value).

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Figure 1:
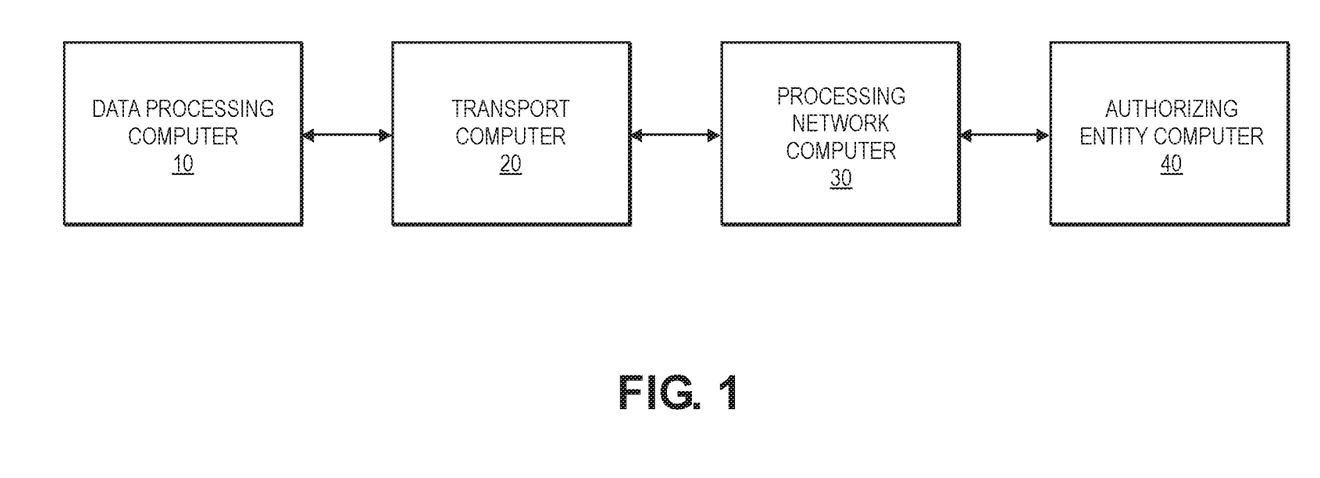
FIG. 1 shows a block diagram of a system according to embodiments of the invention.

FIG. 1 shows a block diagram of a system according to an embodiment. The system comprises a data processing computer 10 in operative communication with an authorizing entity computer 40 via a transport computer 20 and a processing network computer 40.

Messages between the computers illustrated in FIG. 1 can be transmitted using a secure communications protocols such as, but not limited to, File Transfer Protocol (FTP);

HyperText Transfer Protocol (HTTP); Secure Hypertext Transfer Protocol (HTTPS), SSL, ISO (e.g., ISO 8583) and/or the like. The communications network that allow the computers to communicate may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The data processing computer 10 may include any suitable computer that can process data. In some embodiments, the data processing computer 10 can be a computer that is operated by a governmental agency such as the Internal Revenue Service, a state government agency that provides benefits such as unemployment payments, an entity (e.g., a merchant) that provides rebates for past purchases, or any other suitable entity.

The transport computer 20 may be any suitable computer that can be used to transport data. In some embodiments, the transport computer 20 may be operated by an acquirer and can be an acquirer computer.

The processing network computer 30 can process or transport data. It can be in a payment processing network. The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

The authorizing entity computer 40 may be a computer that can be operated by an authorizing entity. An authorizing entity may be an entity that can authorize an interaction such as a transaction. In some embodiments, an authorizing entity may be an issuer and the authorizing entity computer may be an issuer computer.

Figure 2:
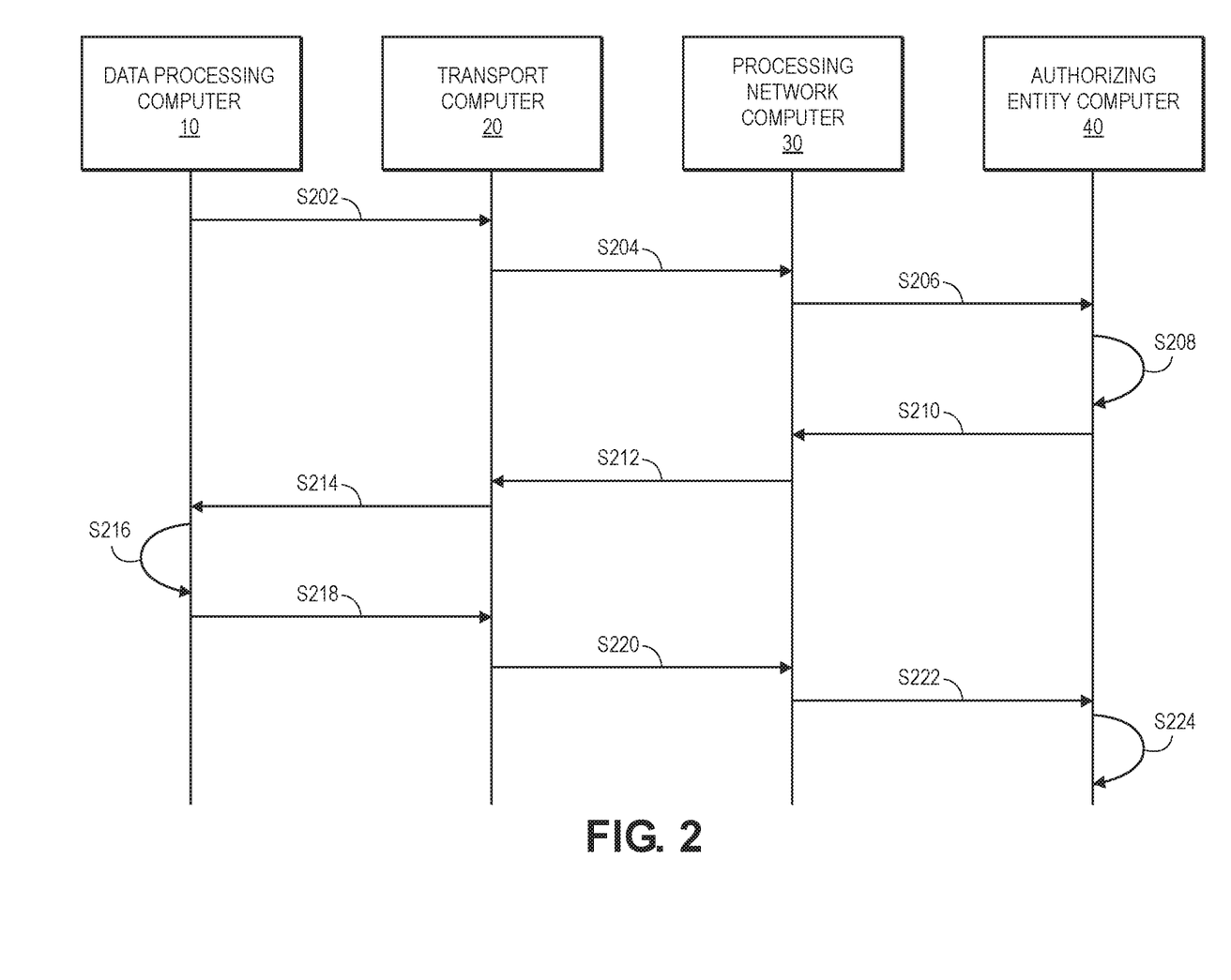
FIG. 2 shows a flow diagram illustrating a method according to an embodiment.

FIG. 2 shows a flow diagram illustrating an embodiment of the invention.

Prior to step S202, the data processing computer 10 may interact with a user in some way. For example, in some embodiments, the data processing computer 10 may be operated by a governmental agency such as the Internal Revenue Service (IRS). The IRS may have received a tax return from the user or from an accountant working on behalf of the user. The data processing computer 10 can then determine that the user is entitled to a refund. Once the data processing computer 10 determines that the user is entitled to the refund, the data processing computer 10 can electronically push the refund to a target account of the user.

However, before pushing the refund to the target account of the user, one or more personal data elements of the user may be transmitted to an authorizing entity computer 40 operated by an authorizing entity (e.g., a bank) that holds the target account of the user. For example, in steps S202, S204, and S204, the data processing computer 10 can transmit a verification request message comprising one or more personal data elements such as an address (e.g., 123 Main St., San Francisco, Calif. 94111) associated with the user, and a target account identifier associated with the user to the authorizing entity computer 40. The verification request message may be sent to the authorizing entity computer 40 via the transport computer 20 and the processing network computer 30. In other embodiments, the data processing computer 10 can have an API that allows it to communicate directly with the authorizing entity computer 40 and/or the processing network computer 30 (which can then communicate with the authorizing entity computer 40).

In some embodiments, in step S202, a verification request message can be sent from the data processing computer 10 to the transport computer 20 in a first data format (e.g., an XML) document. In step S204, after receiving the verification request message in the first format, the verification request message can be reformatted, by the transport computer 20, to a second format such as an ISO message format (e.g., ISO 8583). The reformatted verification request message may then be routed from the transport computer 20 to the processing network computer 30. In some embodiments, the transport computer 20 can be operated by an entity (e.g., an acquirer) that holds an account of the entity that operates the data processing computer 10.

In step S206, the processing network computer 30 may determine the appropriate authorizing entity computer 40 and may then route the verification request message to the authorizing entity computer 40. The processing network computer 30 may have a routing table that allows the authorizing entity computer 40 to route messages between various transport computers operated by acquirers and various authorizing entity computers operated by a number of issuers. The target account identifier in the verification request message may be used to route the verification request message to the correct authorizing entity computer. For example, the target account identifier can be a 16 digit credit card number, where the first six digits is the BIN or bank identification number.

In some embodiments, the verification request message in step S204 may be characterized as a first verification request message and the subsequent verification request message in step S208 may be considered a second verification request message.

At step S208, the authorizing entity computer 40 may receive the verification request message comprising the address (an example of a first personal data element), and the target account identifier. The authorizing entity computer 40 may then retrieve the address (an example of a second personal data element) associated with the target account identifier from a database, and may determine if the retrieved address matches the address that was received in the verification request message. If the addresses match, then the authorizing entity computer 40 can generate an address verification result that indicates a positive match. If the addresses do not match, then the authorizing entity computer 40 can generate an address verification result that indicates a lack of a match.

In some embodiments, the match result may not strictly be binary in nature. For example, the match result may indicate a full match, a partial match, or no match. In some instances, misspellings or other clerical errors may result in a partial match. In other cases, one data element such as a street name may match, but the residence number does not match. In some cases, the verification result can indicate this or in other cases, the verification result may be a match score. For example, an obvious clerical error such as non-matching street names due to a transposed letters may receive a high match score, whereas two addresses with totally different street names but the same zip code will have a low match score. The authorizing entity computer 40 may have rules regarding whether a credit will or will not be processed depending upon the verification result.

At step S210, the authorizing entity computer 40 may generate and transmit a verification response message comprising the address verification result to the processing network computer 30. At step S212, the processing network computer 30 may transmit the verification response message to the transport computer 20. At step S214, the transport computer 20 may transmit the verification response message to the data processing computer 10.

At step S216, upon receiving the verification response message with the positive match indicator (e.g., full match or partial match, if desired), the data processing computer 10 may then generate a credit transaction message. The credit transaction message may comprise at least a source account identifier associated with the data processing computer 10, the target account identifier, an amount to be credited to an account of the target account identifier, and optionally the verification result. The target account identifier may include any suitable information that can be used to identify an account. This can include an account number, as well as an expiration date or card verification value (CVV2).

The credit transaction message may also include other data elements.

Such data elements may include the transaction type (load, bill payment, funds disbursement), data processing computer identifier, personal data elements of the user (e.g., name, address), personal data elements of the sender (e.g., address of the sender), etc.

If the match indicator that is received from the authorizing entity computer 40 by the data processing computer 10 is negative (e.g., no match), then the data processing computer 10 can decide that it will not send any funds to the target account. The lack of a match may indicate that fraud and/or identity theft may be associated with the current transaction.

At steps S218, S220, and S222, the credit transaction message may be transmitted from the data processing computer 10 to the authorizing entity computer 40 via the transport computer 20 and the processing network computer 30. In some embodiments, the credit transaction message may be a single data format as it passes in steps S218, S220, S222. In other embodiments, the data format of the credit transaction message may be converted (e.g., by the transport computer 20) similar to the verification request message described above. In other embodiments, communication may be more direct between the data processing computer 10 and the authorizing entity computer 41.

At step S224, the authorizing entity computer 40 can credit the target account for the amount in the credit transaction message. Once the credit has been made, the user may use the funds in the target account. The authorizing entity computer 40 may also notify the data processing computer 10 that it received and processed the credit transaction message.

At the end of the day or at any other suitable period of time, a settlement will occur and funds may be transferred from the source account associated with the data processing computer 10 and held at the operator of the transport computer 20, to the entity operating the authorizing entity computer 40.

Figure 3:
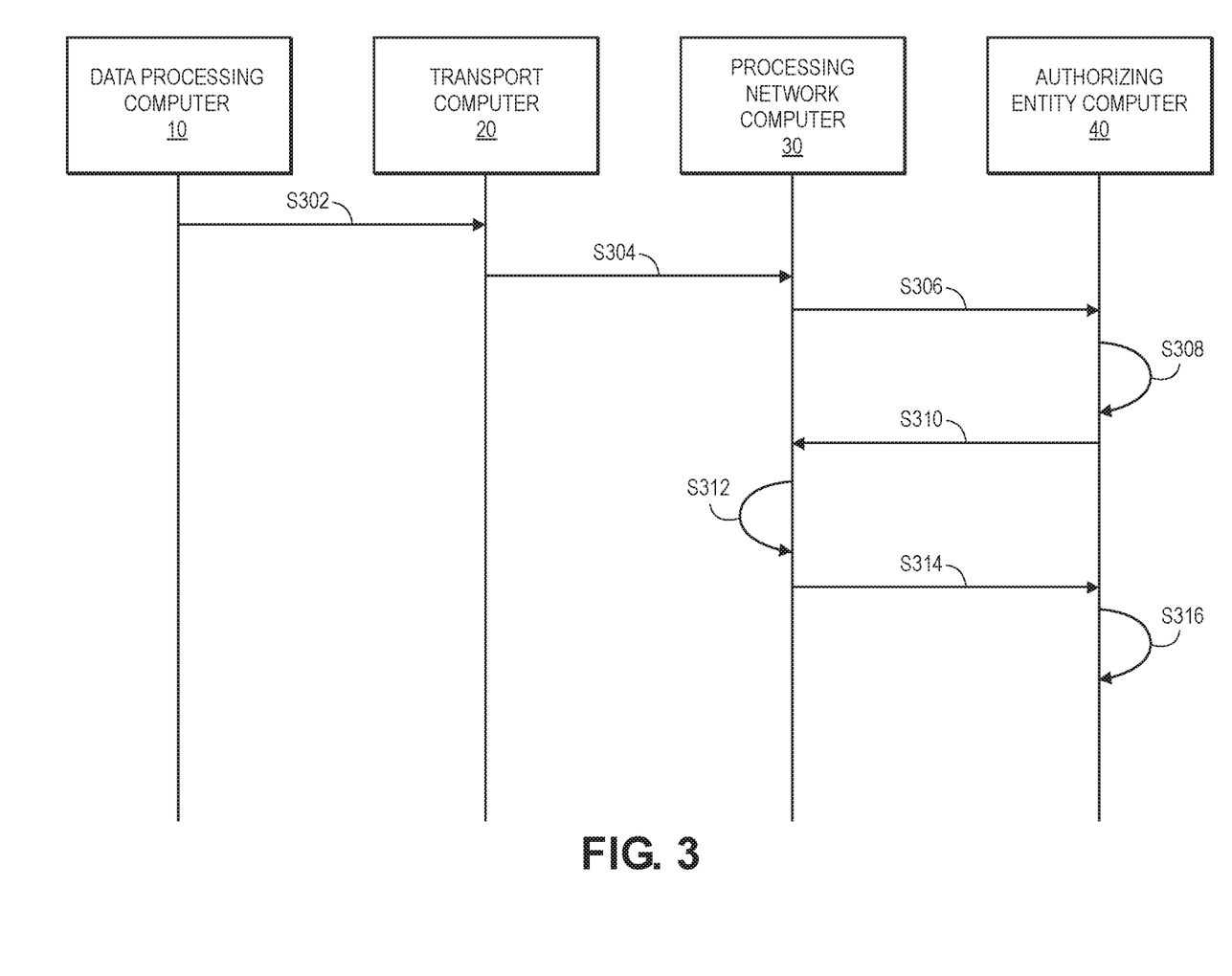
FIG. 3 shows a flow diagram illustrating a method according to another embodiment.

FIG. 3 shows a flow diagram illustrating another embodiment of the invention. In this embodiment, the processing network computer 30 may stand in and perform functions on behalf of the data processing computer 10. Thus, fewer communications involving the data processing computer 10 are needed in this embodiment as compared to the embodiment in FIG. 2.

As in the embodiment illustrated in FIG. 2, prior to step S302 in FIG. 3, the data processing computer 10 may interact with a user in some way.

In steps S302, S304, and S306, the data processing computer 10 can transmit a verification request message comprising a personal data element such as an address associated with a user and a target account identifier to an authorizing entity computer 40 via the transport computer 20 and the processing network computer 30. In other embodiments, the data processing computer 10 can have an API that allows it to communicate directly with the authorizing entity computer 40 and/or the processing network computer 30 (which may communicate with the authorizing entity computer 40). However, in this embodiment, data elements, such as an amount and a source account identifier, may be included in the verification request message.

In some embodiments, in step S302, a verification request message can be sent from the data processing computer 10 to the transport computer 20 in a first data format (e.g., an XML) document. In step S304, after receiving the verification request message in the first format, the verification request message can be reformatted to a second format such as an ISO message format (e.g., ISO 8583). The reformatted verification request message may then be routed from the transport computer 20 to the processing network computer 30.

In step S306, the processing network computer 30 further reformat the verification request message by removing credit message data elements such as the amount and source account identifier. The resulting verification request message may primarily contain the target account identifier and the address. The processing network computer 30 may further determine the appropriate authorizing entity computer 40 and may then route the verification request message to the authorizing entity computer 40.

At step S308, the authorizing entity computer 40 may receive the verification request message comprising the address, and the target account identifier. The authorizing entity computer 40 may then retrieve the address associated with the target account identifier from a database, and may determine if the retrieved address matches the address that was received in the verification request message. If the addresses match, then the authorizing entity computer 40 can generate an address verification result that indicates a positive match. If the addresses do not match, then the authorizing entity computer 40 can generate an address verification result that indicates a lack of a match. Also, as noted in the embodiments described with respect to FIG. 2, the address verification result could indicate a partial match or a match score.

At step S310, the authorizing entity computer 40 may generate and transmit a verification response message comprising the address verification result to the processing network computer 30. At step S312, the processing network computer 30 may then perform stand in processing for the data processing computer 10. The processing network computer may, upon receipt of a positive match indicator, generate a credit transaction message. At step S314, the credit transaction message may be transmitted to the authorizing entity computer 40. The credit transaction message may comprise a source account identifier associated with the data processing computer 10, the target account identifier, an amount to be credited to an account of the target account identifier, and optionally the verification result.

At step S316, the authorizing entity computer may then parse the credit transaction message, and may then credit the account associated with the target account identifier. The authorizing entity computer 40 may also notify the data processing computer 10 that it received and processed the credit transaction message.

At a later time, a settlement process can occur between the transport computer 20 and the authorizing entity computer 40 via the processing network computer 30.

Figure 4:
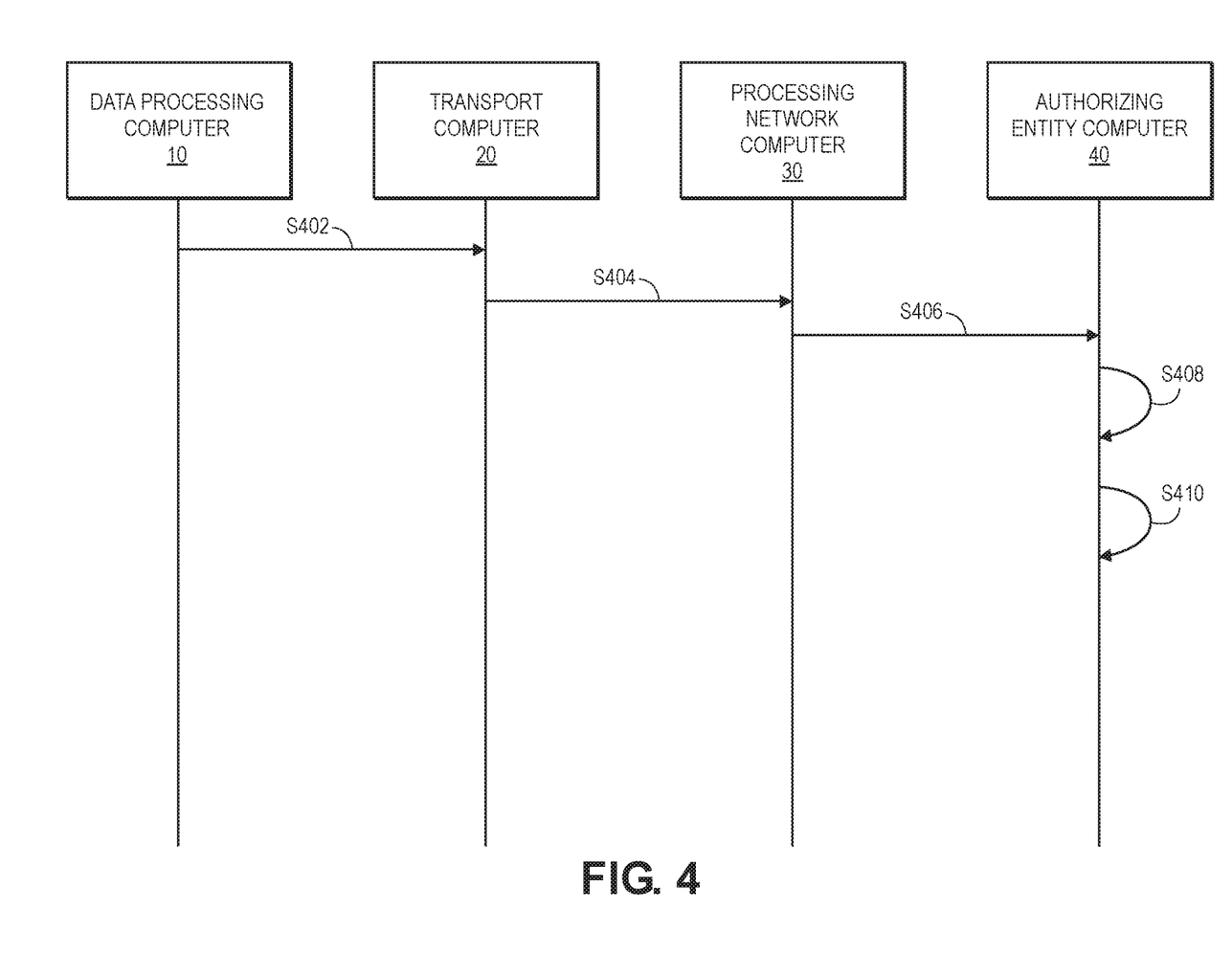
FIG. 4 shows a flow diagram illustrating a method according to another embodiment.

FIG. 4 shows a flow diagram illustrating another embodiment of the invention. In this embodiment, the authorizing entity computer 40 performs the verification process for any personal data elements and also the credits the target account without the involvement of the processing network computer 30 or the data processing computer 10.

As in the embodiment illustrated in FIG. 2, prior to step S302 in FIG. 4, the data processing computer 10 may interact with a user in some way.

In steps S402, S404, and S406, the data processing computer 10 can transmit a verification request message comprising an address associated with a user and a target account identifier to an authorizing entity computer 40 via the transport computer 20 and the processing network computer 30. In other embodiments, the data processing computer 10 can have an API that allows it to communicate directly with the authorizing entity computer 40 and/or the processing network computer 30 (which may communicate with the authorizing entity computer 40). However, in this embodiment, data elements, such as an amount and a source account identifier, may be included in the verification request message.

In some embodiments, in step S402, a verification request message can be sent from the data processing computer 10 to the transport computer 20 in a first data format (e.g., an XML) document. In step S404, after receiving the verification request message in the first format, the verification request message can be reformatted to a second format such as an ISO message format (e.g., ISO 8583). The reformatted verification request message may then be routed from the transport computer 20 to the processing network computer 30.

In step S406, the processing network computer 30 determine the appropriate authorizing entity computer 40 and may then route the verification request message to the authorizing entity computer 40.

At step S408, the authorizing entity computer 40 may receive the verification request message comprising the address, and the target account identifier. The authorizing entity computer 40 may then retrieve the address associated with the target account identifier from a database, and may determine if the retrieved address matches the address that was received in the verification request message. If the addresses match, then the authorizing entity computer 40 can generate an address verification result that indicates a positive match. If the addresses do not match, then the authorizing entity computer 40 can generate an address verification result that indicates a lack of a match. Also, as noted above in the embodiments described with respect to FIG. 2, the address verification result could indicate a partial match or a match score.

At step S410, the authorizing entity computer 40 may upon determination of a positive match indicator, credit the account associated with the target account identifier. If the determination is that there is no match, then the data processing computer 10 may be notified of this and the authorizing entity computer will not credit the target account for the amount in the verification request message.

At a later time, a settlement process can occur between the transport computer 20 and the authorizing entity computer 40 via the processing network computer 30.

In any of the embodiments in FIGS. 2-4, the messages may contain a transaction identifier or session identifier, such that the computers in the system associate the various messages with a single transaction. Further, in any of the embodiments in FIGS. 2-4, the user may be notified at their communication device by any of the authorizing entity computer 40 or the data processing computer 10 that the credit to the target account did or did not take place.

Figure 5:
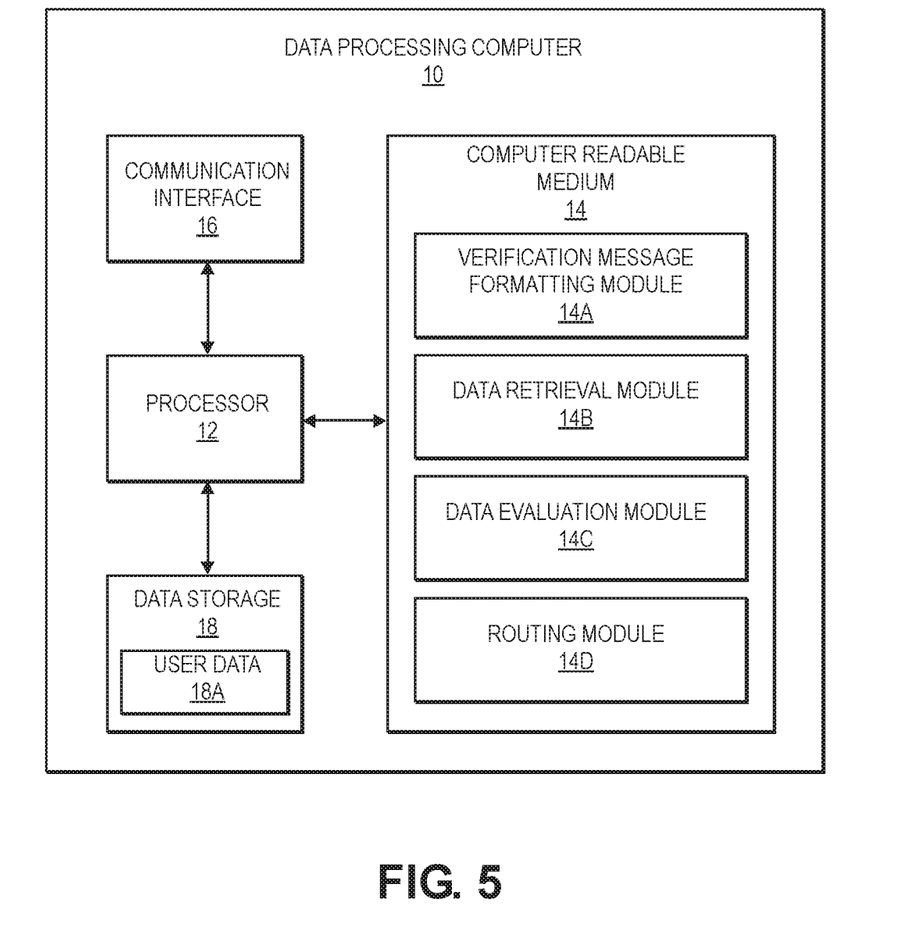
FIG. 5 shows a block diagram of a data processing computer according to an embodiment.

FIG. 5 shows a block diagram of a data processing computer 10 according to an embodiment. The data processing computer 10 may comprise a processor 12, which may be coupled to a data storage 18 (or memory) and an external communication interface 16. The data storage 18 may store user data 18A which may include one or more personal data elements of one or more users. A non-transitory computer readable medium 14 may also be operatively coupled to the processor 32.

The non-transitory computer readable medium 14 may comprise a number of software modules including a verification message formatting module 14A, a data retrieval module 14B, a data evaluation module 14C, and a routing module 14D.

The verification message formatting module 14A may, in conjunction with the processor 12, format a verification request message for transmission to an authorizing entity computer.

The data retrieval module may, in conjunction with the processor 12, retrieve data from the data storage 18 for inclusion in a verification request message.

The data evaluation module 14C may, in conjunction with the processor 12, evaluate data such as a verification result to determine if an credit message should or should not be generated. The data evaluation module 14C can, with the processor 12, evaluate rules (e.g., relating to partial matches, full match, or no match), to determine whether or not a credit message should or should not be generated.

The routing module 14D may in conjunction with the processor 12, determine where to route verification request messages and credit transaction messages.

The non-transitory computer readable medium 14 may comprise code, executable by the processor 12, to perform a method comprising transmitting a verification request message comprising one or more personal data elements associated with a user and a target account identifier to an authorizing entity computer; receiving a verification response message comprising a verification result from the authorizing entity computer; and transmitting a credit transaction message comprising a source account identifier and an amount to the authorizing entity computer, which credits an account of the user with the amount.

Figure 6:
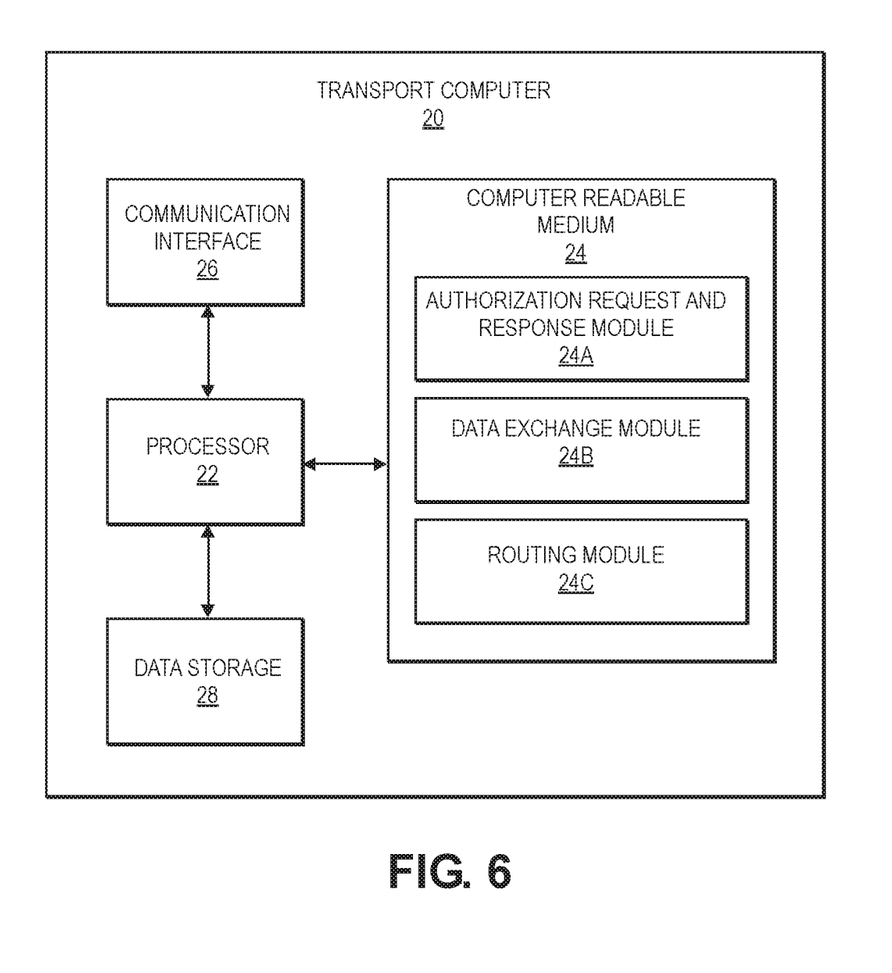
FIG. 6 shows a block diagram of a transport computer according to an embodiment.

FIG. 6 shows a block diagram of a transport computer 20 according to an embodiment. The transport computer 20 may comprise a processor 22, which may be coupled to a data storage 28 and an external communication interface 26. A non-transitory computer readable medium 24 may also be operatively coupled to the processor 32.

The computer readable medium 24 may comprise a number of software modules including an authorization request and response module 24A, a data exchange module 24B, and a routing module 24C.

The authorization request and response module 24A may, in conjunction with the processor 22, forward, generate, or route transaction request and response messages.

The data exchange module 24B may, in conjunction with the processor 22, convert data from one message format to another message format. For example, the data exchange module 24B may convert messages that may be formatted using XML to messages that may be formatted using ISO standards (e.g., ISO 8583).

The routing module 24C may, in conjunction with the processor 22, route messages such as verification request and response messages, and credit transaction messages.

Figure 7:
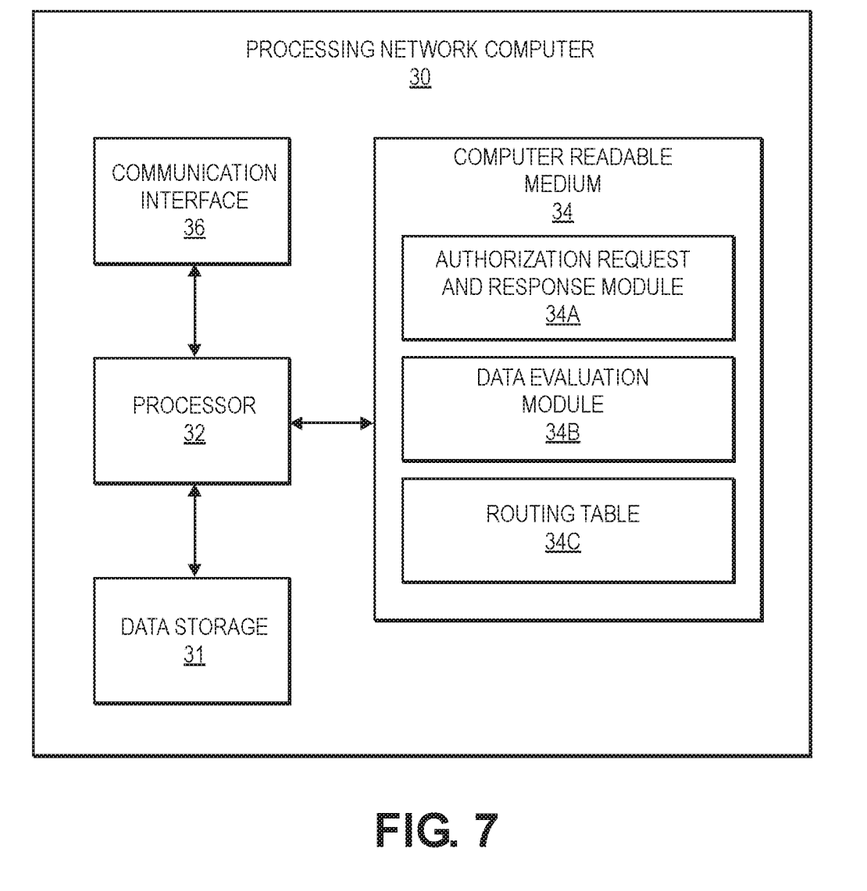
FIG. 7 shows a block diagram of a processing network computer according to an embodiment.

FIG. 7 shows a block diagram of a processing network computer 30 according to an embodiment. The processing computer 30 may comprise a processor 32, which may be coupled to a data storage 31 and an external communication interface 36. A non-transitory computer readable medium 34 may also be operatively coupled to the processor 32.

The computer readable medium 34 may comprise a number of software modules including an authorization request and response module 34A, a data evaluation module 34B, and a routing table 34C. The computer readable medium 34 may also comprise a clearing and settlement module, which comprises code that can cause the processing network computer 30 to perform clearing and settlement functions with transport computers and authorizing entity computers.

The authorization request and response module 34A may comprise code that can cause the processor 32 to evaluate authorization request messages for transactions and determine if the transactions should be authorized. The authorization request and response module 34A may also include code for routing or modifying authorization request and response messages as they pass between various parties such as issuers and acquirers. It may also include code for generating transaction request messages.

The data evaluation module 34B may in conjunction with the processor 32, evaluate a verification result to determine if subsequent actions (e.g., generating and transmitting a credit transaction message) should or should not take place. The data evaluation module 34B can, with the processor 32, evaluate rules (e.g., relating to partial matches, full match, or no match), to determine whether or not a credit message should or should not be generated.

The routing table 34C can list authorizing entity identifiers (e.g., bank account identifiers) that may be part of target account identifiers (primary account numbers), to destination addresses (e.g., IP addresses) associated with authorizing entity computers.

The non-transitory computer readable medium 11 may comprise code, executable by the processor 32, to perform a method comprising transmitting a verification request message comprising one or more personal data elements associated with a user and a target account identifier to an authorizing entity computer; receiving a verification response message comprising a verification result from the authorizing entity computer; and transmitting a credit transaction message comprising a source account identifier and an amount to the authorizing entity computer, which credits an account of the user with the amount.

Figure 8:
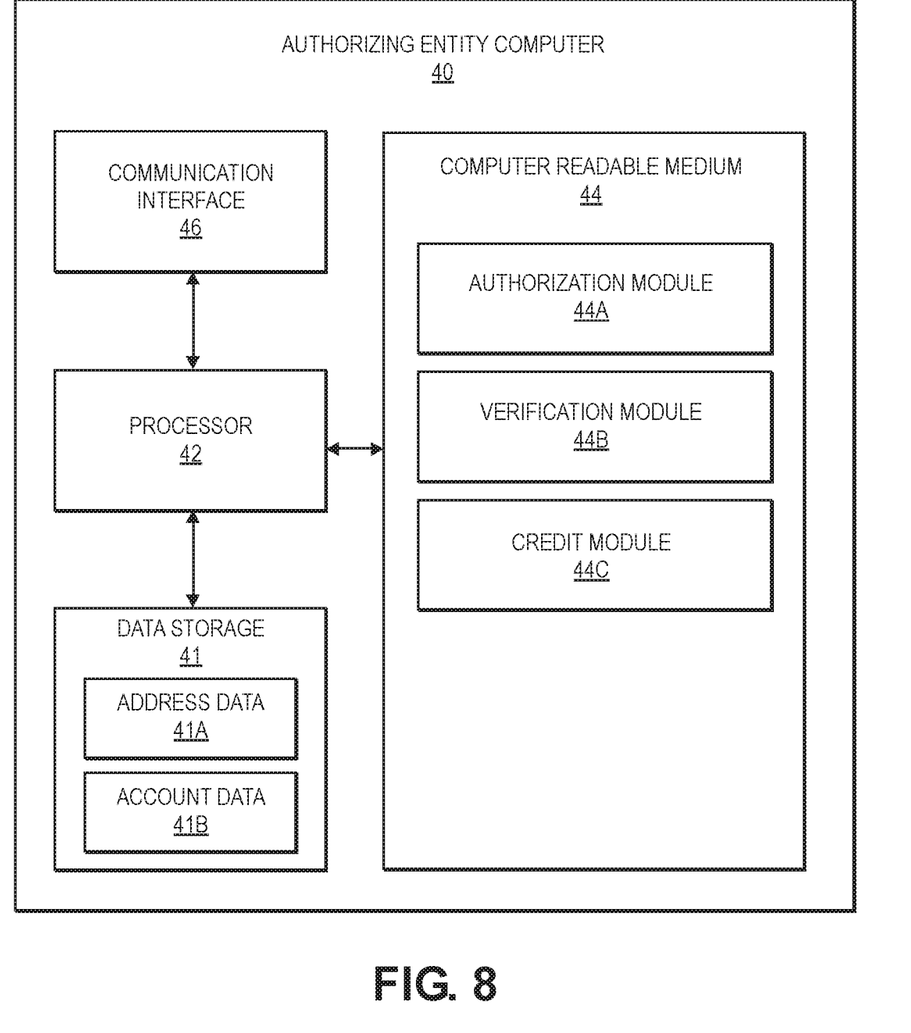
FIG. 8 shows a block diagram of an authorizing entity computer according to an embodiment.

FIG. 8 shows a block diagram of an authorizing entity computer 40 according to an embodiment. The authorizing entity computer 40 may comprise a processor 42, which may be coupled to a data storage 41 and an external communication interface 46. A non-transitory computer readable medium 44 may also be operatively coupled to the processor 42. The data storage 41 may store address data 41A (or other personal data elements) and account data 41B such as account identifiers and their account balances and the like.

The computer readable medium 44 may comprise a number of software modules including an authorization module 44A, an authentication module 44B, and a credit module 44C.

The authorization module 44A may perform authorization services in conjunction with the processor 42. Authorization services may determine if authorization request messages should or should not be approved. It may also generate authorization response messages in response to the receipt of authorization request messages.

The verification module 44B may comprise code, executable by the processor 42, to verify that a received personal data element (e.g., an address) matches a stored personal data element. The verification module 44B and the processor 42 can perform the matching processes that are described above with respect to FIGS. 2-4.

The credit module 44C may comprise code, executable by the processor 42, to credit a target account for a certain amount, as described above.

The computer readable medium 44 may comprise code, executable by the processor 42 to perform a method comprising receiving, by an authorizing entity computer, a verification request message comprising a target account identifier and a first personal data element from a computer; retrieving, by the authorizing entity computer a second personal data element from a data storage; determining, by the authorizing entity computer, if the first personal data element matches the second personal data element; generating, by the authorizing entity computer, a verification result in response to determining if the personal data element matches the second personal data element; transmitting, by the authorizing entity computer, a verification response message comprising the verification result to the computer; and crediting, by the authorizing entity, the target account identifier for an amount.

Below are some examples of data elements that can be used in embodiments of the invention.

ADDRESS_ON_RETURN=The address listed on the applicant's IRS tax return.

PAN_ON_RETURN=The payment card account number which the IRS tax return applicant requests the funds be sent to.

ISSUER_ADDRESS_FOR_PAN(ANY_PAN)=is a function which uses a PAN as input, that returns the complete address from the Issuer.

ADDRESS_IDENTIFIER=The condensed form of the address which varies based on which of the 3 AVS comparison algorithms is used.

Complete Address, not condensed.

Zip Only

Numerics Only: All non-numeric characters (including spaces) are deleted from the string.

ADDRESS_CONDENSE(INPUT, ALGORITHM_NUMBER) is a function that returns the ADDRESS IDENTIFIER when given an address as input.

Below is exemplary pseudocode to effect a credit transaction when ADDRESS_ON_RETURN matches take place.

ADDRESS_ON_RETURN="1 Vincent Place, Oakdale, N.Y. 11769" PAN_ON_RETURN=5555551234567890 ISSUER_ADDRESS_IDENTIFIER= ADDRESS_CONDENSE(ISSUER_ADDRESS_FOR_PAN (5555551234567890),3) IRS_ADDRESS_IDENTIFIER=ADDRESS_CONDENSE(ADDRESS_ON_RETURN, 3)

```
IF (IRS_ADDRESS_IDENTIFIER==ISSUER_ADDR-
   ESS_IDENTIFIER) THEN
   Initiate Visa Direct Payment from IRS to PAN_ON_
      RETURN
ELSE
   Notify IRS of Blocked Payment, due to failed Address
      Verification of Recipient
```

This routine works if ALGORITHM_NUMBER used to condense the ISSUER_ADDRESS and IRS_ADDRESS is always the same. The choice of algorithm '1', '2', '3' can yield different false positive and false negative rates.

Embodiments of the invention have a number of advantages. Because an address is checked before providing an immediate credit to an account associated with a target account, a fraudulent actor will not be able impersonate a legitimate user. If a fraudulent actor attempts to have funds deposited to his or her account using another user's information (e.g., address), then the address associated with the account identifier for the account will not match the legitimate user's address. As such, fraud will be prevented using embodiments of the invention. Further, because a push, credit transaction message is used in embodiments of the invention, any refunds or other value is received by the intended recipient much faster than current refunds that are issued by organizations such as the Internal Revenue Service.

Embodiments of the invention are also counterintuitive, since a sending entity that pushes value to another party does not need to verify information of the recipient, since the ending entity usually has the information of the recipient before she or he decides to initiate the push process.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a computer and from a data processing computer, a verification request message comprising an address associated with a user, and a credit card number or debit card number in a first data format the first data format comprising an extensible markup language (XML) data format;
   converting, by the computer utilizing a data exchange module, the verification request message into a second data format, the second data format comprising an International Organization for Standardization (ISO) standards message format;
   transmitting, by the computer, the verification request message in the second data format, and comprising the address associated with the user, and the credit card number or debit card number to an authorizing entity computer, wherein the authorizing entity computer holds an account of the user associated with the credit card number or debit card number, and wherein the authorizing entity computer determines that the address matches an address associated with the credit card number or debit card number, and that is stored in a database, and then generates a verification result indicating that the received address matches the stored address;
   receiving, by the computer, a verification response message comprising the verification result from the authorizing entity computer;
   transmitting, by the computer, the verification response message to the data processing computer;
   receiving, by the computer and from the data processing computer, a credit transaction message in the second data format and comprising a source account identifier associated with the data processing computer, the credit card number or the debit card number, an amount to the authorizing entity computer which credits the account of the user with the amount, the verification result, a transaction type, and personal data elements of the user;
   converting, by the computer, the credit transaction message from the second data format to the first data format; and
   transmitting, by the computer, the converted credit transaction message to the authorizing entity computer which credits the account of the user with the amount.

2. The method of claim 1, wherein the computer is a processing.

3. The method of claim 1, wherein the verification result comprises a partial match.

4. The method of claim 1, wherein the computer is a processing network computer, and the verification request message in the first data format is received from the data processing computer.

5. The method of claim 1, further comprising:
   receiving, by the computer, a notification that the account of the user has been credited with the amount.

6. The method of claim 1, wherein the verification request message in the first data format comprises the source account identifier.

7. The method of claim 1, wherein the verification result is a full match.

8. The method of claim 1, wherein the credit transaction message is transmitted to the authorizing entity computer via a transport computer.

9. The method of claim 1, wherein the data processing computer obtains the address and the credit card number or debit card number from a tax return.

10. A computer comprising:
a processor; and
a non-transitory computer readable medium, the non-transitory computer readable medium comprising code, executable by the processor for implementing a method comprising:
receiving from a data processing computer, a verification request message comprising an address associated with a user, and a credit card number or debit card number in a first data format the first data format comprising an extensible markup language (XML) data format;
converting, utilizing a data exchange module, the verification request message into a second data format, the second data format comprising an International Organization for Standardization (ISO) standards message format;
transmitting the verification request message in the second data format, and comprising the address associated with the user, and the credit card number or debit card number to an authorizing entity computer, wherein the authorizing entity computer holds an account of the user associated with the credit card number or debit card number, and wherein the authorizing entity computer determines that the address matches an address associated with the credit card number or debit card number, and that is stored in a database, and then generates a verification result indicating that the received address matches the stored address;
receiving a verification response message comprising the verification result from the authorizing entity computer;
transmitting the verification response message to the data processing computer;
receiving, from the data processing computer, a credit transaction message in the second data format and comprising a source account identifier associated with the data processing computer, the credit card number or the debit card number, an amount to the authorizing entity computer which credits the account of the user with the amount, the verification result, a transaction type, and personal data elements of the user;
converting the credit transaction message from the second data format to the first data format; and
transmitting the converted credit transaction message comprising to the authorizing entity computer which credits the account of the user with the amount.

11. The computer of claim 10, wherein the address comprises a street address.

12. The computer of claim 10, wherein the computer is a processing network computer.

13. The computer of claim 10, wherein the computer is a processing network computer, which is configured to process credit and debit card transactions.

14. A method comprising:
receiving, by an authorizing entity computer, a verification request message comprising a first address associated with a user and a credit card number or debit card number from a data processing computer via a computer, the computer configured to convert the verification request message from a first data format to a second data format using a data exchange module, the first data format comprising an extensible markup language (XML) data format, the second data format comprising an International Organization for Standardization (ISO) standards message format;
retrieving, by the authorizing entity computer a second address from a data storage;
determining, by the authorizing entity computer, that the first address matches the second address;
generating, by the authorizing entity computer, a verification result in response to determining that the first address matches the second address;
transmitting, by the authorizing entity computer, a verification response message comprising the verification result to the computer, the computer configured to:
  transmit the verification response to the data processing computer;
  receive, from the data processing computer, a credit transaction message in the second data format and comprising a source account identifier associated with the data processing computer, the credit card number or the debit card number, an amount to the authorizing entity computer which credits an account associated with the credit card number or the debit card number, the verification result, a transaction type, and personal data elements of the user;
  convert the credit transaction message from the second data format to the first data format; and
  transmit the converted credit transaction message to the authorizing entity computer; and
crediting, by the authorizing entity computer, the account associated with the credit card number or the debit card number for the amount.

15. The method of claim 14, wherein the authorizing entity computer is operated by an issuer.

16. The method of claim 14, wherein the computer is a processing network computer.

* * * * *